3,488,150
PRODUCTION OF HYDROGEN PEROXIDE BY THE
ANTHRAQUINONE PROCESS
Gerhard Käbisch and Hans Wittmann, Rheinfelden,
Baden, Germany, assignors to Deutsche Gold- und
Silber-Scheideanstalt vormals Roessler, Frankfurt
am Main, Germany
No Drawing. Filed Feb. 20, 1967, Ser. No. 617,036
Claims priority, application Germany, Feb. 22, 1966,
D 494,181
Int. Cl. C01b *15/02;* B01j *11/02*
U.S. Cl. 23—207                                    5 Claims

ABSTRACT OF THE DISCLOSURE

Process for the production of hydrogen peroxide by the anthraquinone process in which a mixed catalyst of palladium with another metal of the platinum group (0.1 to 50 wt. percent), especially, iridium (preferably, 5 to 30 wt. percent), is used as hydrogenation catalyst in the hydrogenation step to improve hydrogenation selectivity and/or activity.

CROSS-REFERENCE TO RELATED APPLICATIONS

Reference is made to copending application entitled "Process for Carrying Out Catalytic Hydrogenation Reactions in the Presence of Suspension Catalysts," Ser. No. 598,716, filed Dec. 2, 1966 now Patent 3,432,176, and copending application entitled "Separation of Suspended Unsupported Noble Metal Catalysts from Hydrogenated Liquids," Ser. No. 598,591, filed Dec. 2, 1966 now Patent 3,433,358, which contain related disclosures.

BACKGROUND OF THE INVENTION

Field of the invention

The present invention concerns a process for the production of hydrogen peroxide according to the so-called anthraquinone process using noble metal catalysts in the hydrogenation step.

Description of the prior art

The anthraquinone process for the production of hydrogen peroxide as is known consists in the alternate catalytic hydrogenation and oxidation of an anthraquinone derivative serving as carrier for the reaction, which is passed in a cycle through the steps of hydrogenation, oxidation and extraction (of the hydrogen peroxide formed) in the form of a working solution in which it is dissolved in a suitable solvent.

Raney-nickel, palladium black and palladium supported on carriers have become known or have been suggested as catalysts for the hydrogenation step in industrial plants using such process. Aside from the fact that such catalysts should have a high activity even at low concentration and should be insensitive to poisoning, they also should meet the requirement of high selectivity to avoid hydrogenation of the anthraquinone nucleus and other side reactions. In addition, they should be substantially insensitive to dissolved or free water and have a high dispersion stability to avoid undesired coagulation. With noble metal catalysts it also is of importance that they can easily be regenerated in order that the process not be burdened with losses of the costly noble metals.

Raney catalysts have several serious disadvantages, namely, they are sensitive to oxygen, their selectivity is so poor that they must be prepoisoned with a consequent considerable reduction of their activity and their filterability is not always satisfactory. In addition, because of their pyrophoric nature, their use requires employment of special technical safety measures. As a result, the interest of the art has turned to the use of noble metal catalysts and especially palladium as the hydrogenation catalysts. According to German Patent 913,888 palladium is used as active metal supported on finely divided carriers as a suspension catalyst and according to German Patent 1,112,501 unsupported palladium is employed as a suspension catalyst. In contrast thereto, German published application 1,072,228 describes the use of palladium supported on coarse ground carriers in fixed catalyst beds.

Although palladium catalysts are technically and economically superior to Raney catalysts for the anthraquinone process coming into consideration, the many requirements as to the properties cannot always be combined in an optimum manner. This is especially true of its selectivity, which, as indicated, should be as pronounced as possible, without being to the detriment of its activity. Its insufficient selectivity primarily leads to the production of tetrahydroquinones ("Tetra") because of nuclear hydrogenation in a side reaction in addition to the desired hydrogenation of, for example, ethyl-anthraquinone to ethyl-anthrahydroquinone. As a substantial "Tetra" content in the recycled working solution causes difficulties in the oxidation step because of the low oxidation velocity and also causes the production of increased quantities of decomposition products and losses of quinone, there has been no lack of attempts to suppress the side reaction as far as possible so as to hinder the formation of a high Tetra content. These attempts are the subject of many patents, of which the following are only named as examples: German Patents 1,051,257 and 1,064,038, German published application 1,029,806 and French Patent 1,234,036.

Although the problem of suppression of Tetra production is of considerable significance in the commercial applications of the anthraquinone process, the measures disclosed in the above-mentioned and other patents on this subject, insofar as they are even at all suited for effective suppression of the Tetra formation, involve substantial outlays and therefore place a considerable technical and economic burden on the process.

SUMMARY OF THE INVENTION

According to the invention it was found that the selectivity of palladium as a hydrogenation catalyst in the hydrogenation step of the anthraquinone process can be improved considerably if such palladium is used in conjunction with additions of other metals of the platinum metal group, namely, ruthenium, rhodium, osmium, platinum and especially iridium. The components should be employed in an as intimate a mixture as possible, which best can be effected by joint co-precipitation from solutions of compounds of the palladium and platinum metal components. The improvement in selectivity effected according to the invention contrary to that obtained by the previously known processes surprisingly does not effect a reduction in activity. With appropriate selection of the mixing ratios and the metals of the platinum group mixed with the palladium, the hydrogenation catalyst combinations according to the invention despite considerably increased selectivity also can exhibit a higher activity even than that of pure palladium.

The advantage of the process according to the invention therefore resides in that the activity or the selectivity itself can be influenced to a certain extent by appropriate selection of the composition of the mixed catalyst, as is more particularly illustrated in the examples which follow. In addition it has been found that an undesired premature coagulation, which, for example, occurs with palladium black at higher degrees of hydrogenation can be effectively repressed by the addition of other metals of the platinum group. The enlargement of the secondary particles which is connected with a loss in activity therefore can be avoided. The type and quantity of the added metal of the platinum metal group can play a roll in this connection.

The advantages connected with the process according to the invention are obtained whether the mixed catalysts are used in the form of purely metallic catalysts or as supported catalysts. The purely metallic catalysts formed by co-precipitation of the platinum group metals have primary particle sizes of about 0.01 m$\mu$–1.0 m$\mu$.

The quantity of the metals of the platinum metal group added to the palladium, as can be seen from the examples below, can vary within wide limits, therefore, within the range of 0.1–50 wt. percent of the palladium-platinum group metal mixture, and preferably is between 50 and 30 wt. percent of the palladium.

In view of the varying hydrogenation activity of the various metals of the platinum group and the fact the hydrogenation activity of palladium is substantially superior to that of the remaining metals of the platinum group, it was not to be expected that the mixed catalysts according to the invention in which a portion of the palladium is replaced by other metals which per se have a lower hydrogenating activity have an activity approximating or even better than that of palladium by itself and at the same time an improved selectivity. These relationships between the activities of the various platinum group metal blacks can be seen from the following table in which the quantity of hydrogen taken up by 2-ethylanthraquinone in ml./min. is given as measure for the activity. In each of the tests concerned a suspension of 4.7 g. of 2-ethyl-anthraquinone and 80 ml. of isopropanol was hydrogenated at 35° C. in the presence of 50 mg. of the metallic suspension catalyst concerned in a stirring apparatus. The quantity of hydrogen taken up between the second and third minute is given in such table for each of the catalysts tested. It is an indication of the hydrogen transfer and therefore of the activity of the catalyst.

| Catalyst: | H$_2$ take up in ml./min. |
|---|---|
| Palladium black | 132 |
| Rhodium black | 87 |
| Iridium black | 37 |
| Platinum black | 35 |
| Ruthenium black | 12 |
| Osmium black | 0 |

When analogous tests are made under different conditions, for example, in other solvents or with other anthraquinone derivatives, deviations of the absolute values of the hydrogen take up can occur as well as displacement in the sequence of the metals can occur. However, palladium black always is found to be the most active of the platinum group metal catalysts in the anthraquinone process.

DESCRIPTION OF PREFERRED EMBODIMENTS

The following examples will serve to illustrate the invention with reference to several embodiments of the preferred catalyst combinations.

Example 1.—Improvement in selectively of mixed catalysts of palladium with various contents of iridium as well as with ruthenium and platinum over that of a pure palladium catalyst In the anthraquinone process the selectivity of the catalyst is primarily determinative of the ratio of the anthrahydroquinone formation (main reaction) and the tetrahydroanthraquinone formation (side reaction). This ratio can be determined in recycle tests in that the quantity of anthrahydroquinone produced in a unit of time is compared with the quantity of tetrahydroanthraquinone formed in the same period of time. In laboratory tests approximately the same results are obtained if the velocity of the hydrogen transfer during the main reaction is contrasted with the velocity of the hydrogen take up which occurs after completion of the main reaction. If the hydrogen transfer during the side reaction is set equal to 1, it is easy to calculate how many times faster the velocity of the main reaction is.

In each of the tests concerned in this example, 5 g. of 2-ethyl-anthraquinone were dissolved in 100 ml. of a solvent mixture of aromatic gasoline, principally, of tetramethyl benzine produced by platforming and trioctyl phosphate in a ratio of 3:1 and the hydrogenation carried out in the presence of 50 mg. of the catalyst concerned at 35° C. The results are given in the following table:

| Composition of the suspension catalyst | Activity: H$_2$ take up during main reaction in ml. H$_2$/minute | Ratio main reaction: side reaction |
|---|---|---|
| Pd 100% | 105 | 320:1 |
| Pd 87%, Ir 13% | 103 | 600:1 |
| Pd 77%, Ir 23% | 109 | 640:1 |
| Pd 95%, Pt 5% | 101 | 510:1 |
| Pd 95%, Ru 5% | 95 | 430:1 |

The results indicate that the selectivity of a palladium catalyst can be increased about twofold by the additions of iridium. Similar results are also obtained with other solvents, such as isopropanol and other reaction carriers, that is, other anthraquinone derivatives. As can be seen, additions of platinum and ruthenium have similar effects on the selectivity. Preferably they are employed in quantities of 1–10 wt. percent. Iridium preferably is employed in quantities between 5 and 30 wt. percent.

The following example illustrates that the activity of palladium can be increased considerably by the addition of another platinum group metal in a supported palladium catalyst without reduction in selectivity.

Example 2

In these tests supported catalysts, each of which contained 2 wt. percent of platinum group metal on active aluminum oxide of an average particle size of 0.06 mm. were employed. The hydrogenation was carried out as described in Example 1 except that in each instance 3 g. of the supported catalyst was used rather than 50 mg. of the unsupported catalyst. The results are given in the following table:

| Platinum group metal composition on Al$_2$O$_3$ | Activity: H$_2$ take up during main reaction in ml. H$_2$/minute | Ratio main reaction: side reaction |
|---|---|---|
| Pd 100% | 80 | 300:1 |
| Pd 70%, Ir 30% | 106 | 300:1 |

Technical modifications of the anthraquinone process are known which work with Tetra contents of 50% and more making allowances for the considerably higher outlays in the oxidation step and increased quinone losses because of an oxidative Tetra decomposition. In addition, in this modification a hydrogenative Tetra decomposition can occur by over hydrogenation of the Tetra derivative which again leads to quinone losses. The mixed catalysts employed according to the invention are also advantageously used in this modification of the anthraquinone process as such catalysts do not only have improved activity in, for example, the hydrogenation of 2-ethyl-tetrahydroanthraquinone, but also decrease the danger of over hydrogenation in view of their selectivity, in this case causing a reduction in the hydrogenation decomposition of the Tetra derivative as illustrated by the tests in the following example.

Example 3

These tests were carried out as described in Example 1 except that 2-ethyl-tetrahydroanthraquinone was used as the reaction carrier instead of 2-ethyl-anthraquinone. The results are given in the following table:

| Composition of suspension catalyst | Activity: H₂ take up during main reaction in ml. H₂/minute | Ratio main reaction: side reaction |
|---|---|---|
| Pd 100% | 160 | 1,490:1 |
| Pd 70%, Ir 30% | 185 | 3,290:1 |

The following example illustrates the improved results obtained with use of the preferred mixed catalyst according to the invention in the hydrogenation step of an actual anthraquinone process for the production of hydrogen peroxide.

Example 4

500 liters per hour of a working solution of 120 g. per liter of 2-ethyl-anthraquinone in a 75:25 volume mixture of tetramethyl benzine:trioctyl phosphate were passed through a technical hydrogenation apparatus analogous to that described in application S.N. 598,716 of 100 liter capacity of a cyclically operating anthraquinone process apparatus. 50% of the ethyl-anthraquinone supplied to the hydrogenation apparatus was continuously hydrogenated with H₂ at a gauge pressure of 2 atmospheres (degree of hydrogenation 50%). 100 g. of the suspension catalyst employed was always maintained in the hydrogenation apparatus. After leaving the hydrogenation apparatus the working solution was passed through the other steps of the anthraquinone process, namely, the oxidative and extraction steps and again recycled to the hydrogenation apparatus. The apparatus had a total capacity of 1500 liters so that the operating solution as an average was returned to the hydrogenation step after 3 hours. In the first test the 100 g. of suspension catalyst used in the hydrogenation consisted of pure palladium black. After continuous operation of the cyclic process for 60 days the tetrahydroethylanthraquinone content with reference to total anthraquinone content of the working solution had risen to 16%.

In the second test the 100 g. of suspension catalyst employed in the hydrogenation was a 70/30% Pd/Ir mixture. In this instance the working solution after 60 days' continuous operation of the process only contained 4.5% of tetrahydroethylanthraquinone.

We claim:

1. In a process for the production of hydrogen peroxide by the anthraquinone process in which the anthraquinone containing working solution is recycled through a series of steps of hydrogenation, oxidation and extraction for recovery of hydrogen peroxide produced, the improvement of carrying out the hydrogenation step with said working solution in contact with a catalytically effective amount of a mixed hydrogenation catalyst of palladium in admixture with 0.1 to 50 wt. percent of another metal of the platinum group selected from the group consisting of iridium, ruthenium, rhodium, osmium and platinum.

2. The process of claim 1 in which said mixed catalyst is of a mixture of palladium and iridium.

3. The process of claim 1 in which said mixed catalyst is a suspension catalyst formed by co-precipitation of the platinum group metals having a particle size between about 0.01 and 1 m$\mu$.

4. The process of claim 3 in which said mixed catalyst is of a mixture of about 70 to 95 wt. percent of palladium and about 5 to 30 wt. percent of iridium.

5. The process of claim 4 in which said mixed catalyst is of a mixture of about 70 wt. percent of palladium and about 30 wt. percent of iridium.

References Cited

UNITED STATES PATENTS 3,028,429    4/1962    Wilbert et al. _____ 252—472

FOREIGN PATENTS 1,079,604    4/1960    Germany.

OSCAR R. VERTIZ, Primary Examiner

HOKE S. MILLER, Assistant Examiner

U.S. Cl. X.R.

252—472; 260—369